United States Patent
Lang

(10) Patent No.: US 7,017,268 B2
(45) Date of Patent: Mar. 28, 2006

(54) SEAL REFORMING METHOD AND APPARATUS

(75) Inventor: Joseph C. Lang, Hoffman Estates, IL (US)

(73) Assignee: SKF USA Inc., Elgin, IL (US)

( * ) Notice: Subject to any disclaimer, the term of this patent is extended or adjusted under 35 U.S.C. 154(b) by 270 days.

(21) Appl. No.: 10/692,337

(22) Filed: Oct. 23, 2003

(65) Prior Publication Data

US 2005/0086802 A1 Apr. 28, 2005

(51) Int. Cl.
B21D 53/84 (2006.01)

(52) U.S. Cl. ............... 29/888.3; 29/243.5; 29/243.517; 72/211; 72/170; 72/175

(58) Field of Classification Search ............... 29/888.3, 29/450, 451, 512, 235, 243.5, 243.517; 72/211, 72/170, 175
See application file for complete search history.

(56) References Cited

U.S. PATENT DOCUMENTS

| 1,824,219 A | | 9/1931 | Loveless |
| 2,131,027 A | * | 9/1938 | French et al. ............... 72/107 |
| 2,405,120 A | | 8/1946 | Evans |
| 3,199,549 A | | 8/1965 | Wallshein |
| 3,541,826 A | * | 11/1970 | Halliburton ............... 72/105 |
| 3,866,299 A | | 2/1975 | Gregg |
| 4,205,424 A | | 6/1980 | Nagao |
| 4,218,813 A | | 8/1980 | Cather, Jr. |
| 4,471,526 A | | 9/1984 | Zaltsberg |
| 4,635,335 A | | 1/1987 | Brown |
| 5,009,434 A | | 4/1991 | Nash |
| 5,048,170 A | | 9/1991 | Kuppers |
| 5,213,139 A | | 5/1993 | Deuel |
| 5,490,409 A | | 2/1996 | Weber |
| 5,940,950 A | | 8/1999 | Galat |
| 6,176,115 B1 | | 1/2001 | Van Ryper |
| 6,226,851 B1 | | 5/2001 | Nakajima |
| 6,497,133 B1 | | 12/2002 | Rose |
| 6,523,242 B1 | | 2/2003 | Armellini |

FOREIGN PATENT DOCUMENTS

JP 363278731 A 11/1988

* cited by examiner

Primary Examiner—Eric Compton
(74) Attorney, Agent, or Firm—Vedder Price Kaufman & Kammholz

(57) ABSTRACT

The present invention relates generally to a method and apparatus for temporarily reforming or deforming the lip portion of a resinous seal so that the seal may be readily installed in an intended application. The invention includes a method and apparatus that includes a fixed frame unit having two leg portions and a backbone portion, a slot in each position, an axle in each slot, and roller assemblies received over each axle, with adjustment means for each axle, the guide rollers being circumferentially spaced apart and the center or reforming roller being adjustable.

21 Claims, 3 Drawing Sheets

SEAL REFORMING METHOD AND APPARATUS

BACKGROUND OF THE INVENTION

The present invention relates generally to a method and apparatus for temporarily reforming or deforming the lip portion of a resinous seal so that the seal may be readily installed in an intended application.

There are many uses for seals having lips which are made entirely or primarily of a fluorocarbon resin, such as Teflon (TFE), filled Teflon, or some chemically generally similar polymer, owing to TFE having the chemical resistance, heat resistance, abrasion resistance and other favorable characteristics. Such seals have drawbacks, however, such as lack of resiliency in the lip. Consequently, such seals are ordinarily made by utilizing a lip of the polytetraethylene (PTFE) or like material, entrapped between a seal having a metal outer case and a metal inner case, with the inner case being held in position by being crimped by the outer case. The lip portion of the seal is thus held between radially extending elements of the inner and outer casings. In other instances the resinous lip is bonded directly to the metal cases. In still other instances, the TFE lip is bonded to a rubber gasket or the like which is then bonded to a metal case.

In making Teflon or the like seals, there has been one problem which has confronted the industry for some time. In order to fit these seals over the application, usually a rotary shaft or the like, it is necessary to mechanically "bellmouth" or otherwise distort the seals to at least the diameter on which they will become effective upon installation. The problem with the usual way of bellmouthing these seals is that the apparatus required to perform the bellmouthing operation is fairly large or beyond practical manufacturing methods. Moreover, it must be removed once it has been in use with a large, heavy duty cone or the like. This requires great force. With moderate or large size seals, a large diameter cone or the like device is required, and this takes considerable force to enter and enlarge the effective inside diameter of the seal. In the alternative, it may be an extremely long, tapered cone, and once again, difficult to remove.

The present invention, however, uses various forms of a simple fixture in which the seal is grasped and then may be readily rotated until the lip takes a temporary set. Alternatively, the fixture may be rotated. Then, the seal is promptly installed before it regains its former dimension of the inside diameter. In this concept, the seal typically may be given several rotations after which the member having contact with the lip may be tightened or forced through a slightly larger inside diameter, and further rotated. This will be determined depending on the thickness of the primary seal or PTFE member, whether there is a primary lip, or a primary lip and a secondary lip, and the degree of deformation required.

It is also very easy to remove the tool used in this application prior to installing the seal. Moreover, the seal forming apparatus is relatively compact, weighing considerably less than a tool otherwise developed for this purpose. Still further, an advantage of this tool is that it may be readily adjustable to various sizes of seal, and accordingly, may be used on different sizes of seals by a very simple adjustment which is provided in the mechanism.

According to one embodiment of the invention, there is provided a frame member which includes two outboard legs and a center section or center leg. Each of these legs is preferably slotted so as to receive the end portion of an axle unit which in turn receives a guide roller, or a forming roller. The guide rollers include laterally outer edges containing ridges or the like and are designed to accommodate the exterior casing of the seal and the forming roller will then work on the lip on the inner diameter of the seal. The apparatus may optimally include a frame for being held down by the foot or the leg of the operator, or may contain another device for mounting the unit on a bench or the like. In use, the seal is simply placed on the two previously adjusted, circumferentially spaced apart guide rollers whose position is determined by moving the axles apart or more together, and thereafter positioning the center roller with whatever tension is desired. The center roller engages the lip and reforms it, more or less as desired by the operator, in stages or in a single stage, using one or preferably several passes of the seal by rotating the casing while the seal is being held in place by the guide rollers.

It is therefore an object of the present invention to provide a new and different method of imparting a temporary deformation of the lip of a resinous seal.

It is another object of the invention to provide such a seal having a simple frame unit which is used to position three rollers.

Another object is to provide a frame having two legs and a center section and having rollers that are adjustable for different sizes and different thicknesses of the primary lip seal.

Another object of the invention is to provide an apparatus which will operate satisfactorily with a single, primary lip and one which will work equally well with seals containing a secondary or dirt lip as well as a primary lip.

A further object of the invention is to provide an apparatus having guide rollers and a reforming roller in which both the guide rollers and the reforming roller may be adjusted, both before and during performing, depending on the circumstances.

It is another object of the invention to provide an apparatus which works well with a large variety of seal inside and outside diameters.

Another object is to provide a smaller device resembling a pliers or the like which may hold and position the rollers used in reforming the seal.

A still further object is to provide a device that may use a variety of attachments to enable the apparatus to be held down or manipulated.

It is still a further object of the invention to provide for a novel method of reforming the lip portion of a seal.

BRIEF SUMMARY OF THE INVENTION

These and other objects of the objects and advantages of the invention are achieved by providing a method and an apparatus which includes a fixed frame unit having two leg portions and a backbone portion, a slot in each portion, an axle in each slot, and roller assemblies received over each axle, with adjustment means for each axle, the guide rollers being circumferentially spaced apart and the center or reforming roller being adjustable.

The manner in which these objects and advantages are actually achieved in practice will become more clearly apparent when reference is made to the following detailed description of several preferred embodiment of the invention set forth by way of example and shown in the accompanying drawings, wherein like reference numbers indicate corresponding parts throughout.

DESCRIPTION OF THE PREFERRED EMBODIMENTS OF THE INVENTION

Although the invention may be embodied in different forms and the method may be practiced in different ways, a brief description of a few forms of the invention will be given wherein the preferred forms of apparatus are shown and the methods are illustrated by several examples.

Figure 1:
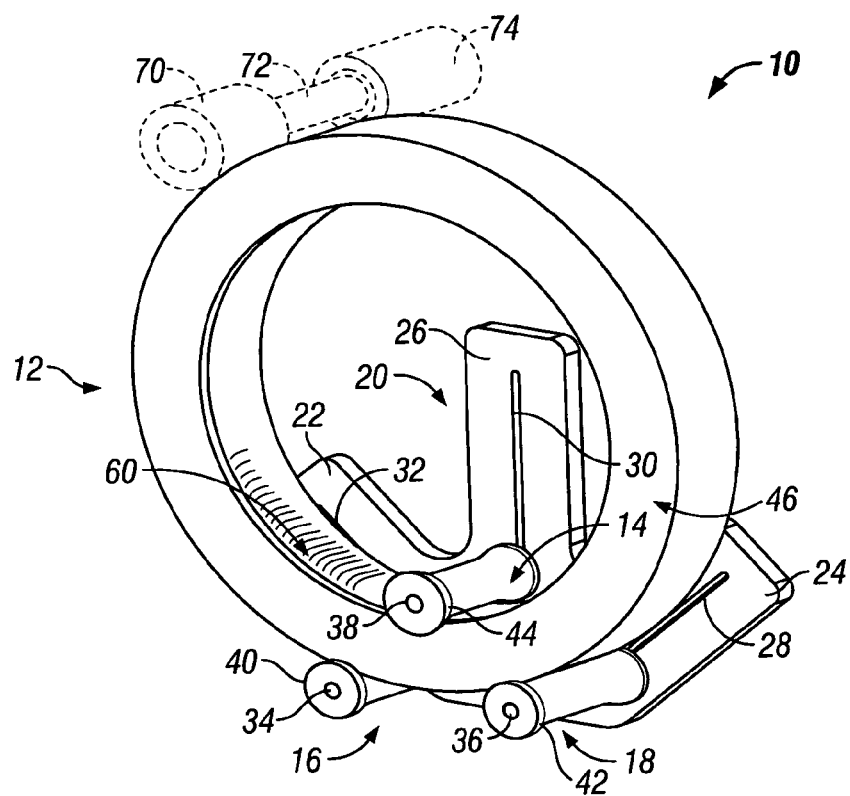
FIG. 1 is a perspective view showing a seal being processed according to the invention, and showing the two side legs, a center leg, and two guide rollers and a reforming roller forming a part of one embodiment of the invention.
Figure 2:
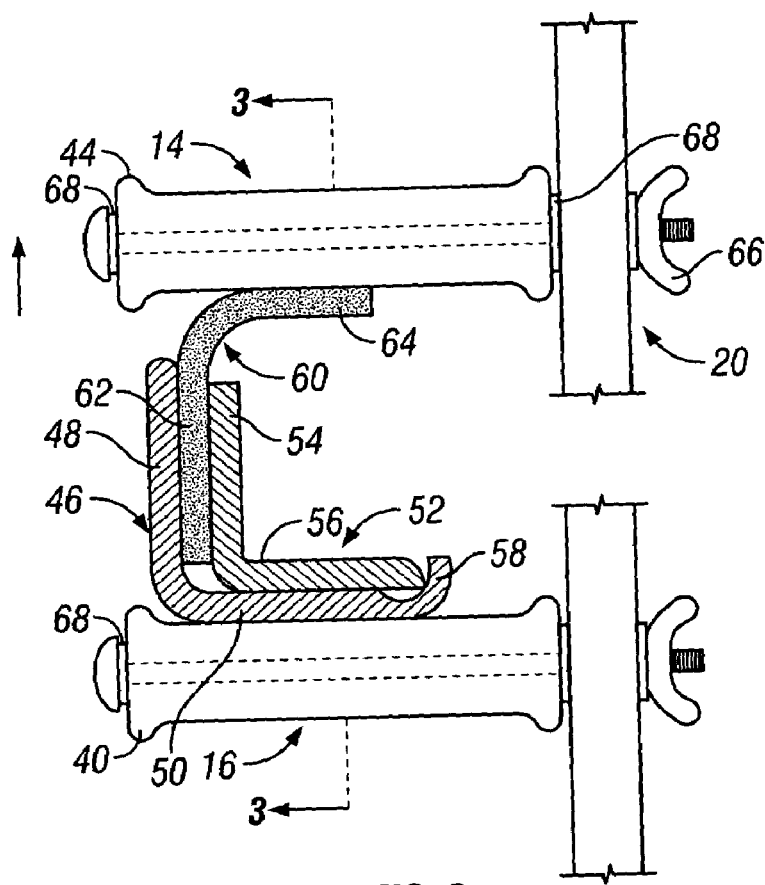
FIG. 2 is a vertical sectional view, somewhat schematic in nature, showing the manner in which a seal having inner and outer cases and an entrapped resinous lip is reformed according to the invention.
Figure 3:
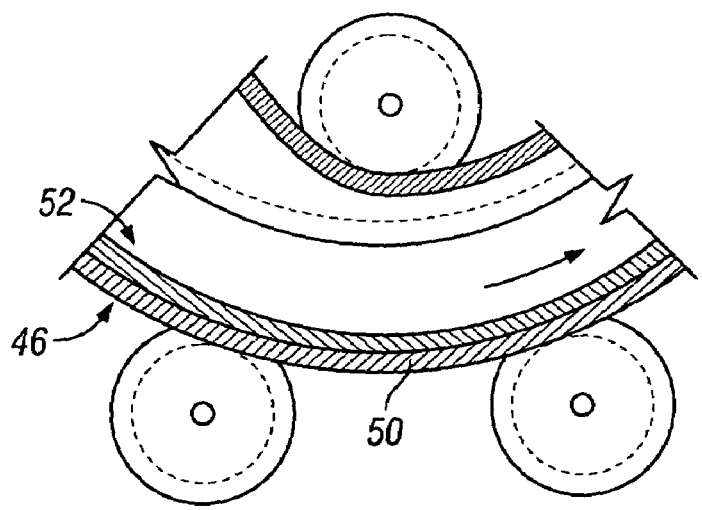
FIG. 3 is an enlarged end sectional view of the apparatus of FIG. 2, taken along lines 3—3 of FIG. 2 and showing the seal being cradled between two guide rollers and having its lip reformed by a reforming roller.

Referring now to FIGS. 1–3, there is shown an apparatus generally designated 10 for temporarily reforming an oil seal generally designated 12 and shown held in place by three rollers generally designated 14, 16, and 18. The apparatus comprises a frame generally designated 20, including a pair of side legs 22, 24 and a center leg 26. Each leg 22, 24, 26 in this embodiment, includes an elongated slot 28, 30, 32, in which is received an axle 34, 36, 38. Each of the axles 34, 36, 38, in turn supports an associated roller 14, 16, 18 for rotation about the axles 34, 36, 38.

In FIG. 1, the rollers 16, 18 are guide rollers and the roller 14 is the reformation roller or the roller that contacts the lip portion of the seal. Each of the rollers 14, 16, 18 preferably includes an outer flange 40, 42, 44, with such roller flanges preferably being present on the two guide rollers both inside and out, and the active or reforming roller optionally having one such flange or two flanges. The seal generally designated 12 is shown to include an outer case generally designated 46 (FIG. 2), and the outer case 46 includes a radial flange 48, and an axial flange 50. The inner case generally designated 52 includes a radial flange 54, an axial flange 56. The outer case 46 includes a curl 58 which keeps the inner case in position against the primary resinous lip generally designated 60. The resinous lip 60 has an entrapped or radially extending portion 62, and a free portion 64, which will be bell-mouthed according to the invention.

Figure 5:
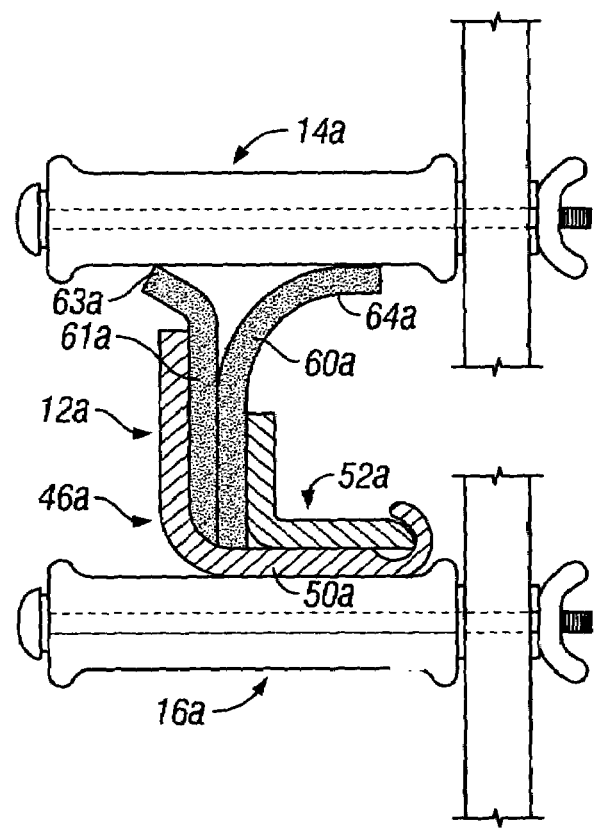
FIG. 5 is a fragmentary vertical sectional view of the apparatus and the seal, somewhat schematic in nature, showing the guide rollers holding the outer case of the seal and the preforming roller engaging both the primary lip and a secondary lip.

FIG. 5 shows a seal generally designated 12a, having all the components of the seal of FIG. 3, except that the casings 46a, 52a also enclose an auxiliary or secondary lip (sometimes referred to as a dirt lip) generally designated 61a in addition to the resinous primary lip 60a.

Referring again to FIGS. 1–3, when it is desired to reform a seal according to the invention, the seal 12 sought to be reformed is placed in the fixture 20 by positioning the axial flange 50 of the outer case on the guide rollers 16, 18. The seal 12 is positioned so that the flanges 40, 42 are outside the seal and thus the seal 12 is in the position shown in FIG. 1.

Next, the central roller 14 is brought into deforming contact with the free portion 64 of the lip 60 by moving the roller 14 and the axle 38 radially outwardly in the slot 30. Then the position of this roller 14 is held or locked in place by tightening the wing nut 66 adjacent the center frame 26, thus placing a reforming radial force on the axle 38. The axle therefore cannot move radially, but friction-reducing lubricous washers 68 allow the rollers to turn freely. These washers may be replaced with so-called Torrington bearings, i.e. roller bearings with radially disposed rollers held in suitable cages. When the first setting is made, the seal is rapidly rotated by hand several times. Thereafter, the setting on the roller 14 is increased—that is, it is moved radially outwardly or toward a greater i.d. of the seal—and the seal is again rapidly rotated. This causes the lip to be temporarily reformed to a greater i.d. dimension, and enables the seal to be fit over a shaft or otherwise in the application. This is done promptly before the lip 60 expands to a smaller i.d.

Where the invention comprises a frame with three slots 28, 30, 32 for the axles 34, 36, 38 it is then possible to accommodate seals of considerably varying sizes. The lower or guide rollers 16, 18 are first set at an appropriate distance—greater or less far apart—and secured in place. This may be done using wing nuts or other tightening means to hold the rollers in place, but allow them to rotate as pointed out. After the seal is placed in position by the guide rollers, the reforming roller 14 is positioned with a desired degree of tension on the free edge 64 of the TFE lip 60. The seal is then rotated and the performing roller 14 is again repositioned one or more times.

The seal is rotated relative to the frame. The usual manner is to have the frame fixed, and the seal rotated. However, in the alternative, the frame may be rotated and the seal held still. When the apparatus is used in a factory or the like, the seal may be rotated, for example, by placing a rotary roller or wheel 70 driven by a rotary shaft 72 and in turn driven by a motor 74. The wheel 70 is pressed against the flange 50 on the o.d. of the seal in this example. The wheel 70 and motor 74 may be fixed to the frame 20 or may be hand held. Other drive means may be provided.

Referring now to FIG. 5, a method of reforming a seal with a primary lip 60a and a dirt lip 61a is shown. The dirt lip 61a is sometimes called an auxiliary lip, a secondary lip or term of like import.

In this case, everything is similar except that the directions in which the lips 60a, 61a are being reformed is opposite each other. Hence, the reforming roller 14a tends to separate the lips so that the portions 64a, 63a are moved in opposite directions. The guide roller 16a rests on the outer casing axial portion 50a. The remainder of the operation is identical to the operation depicted in FIGS. 1–3.

Figure 4:
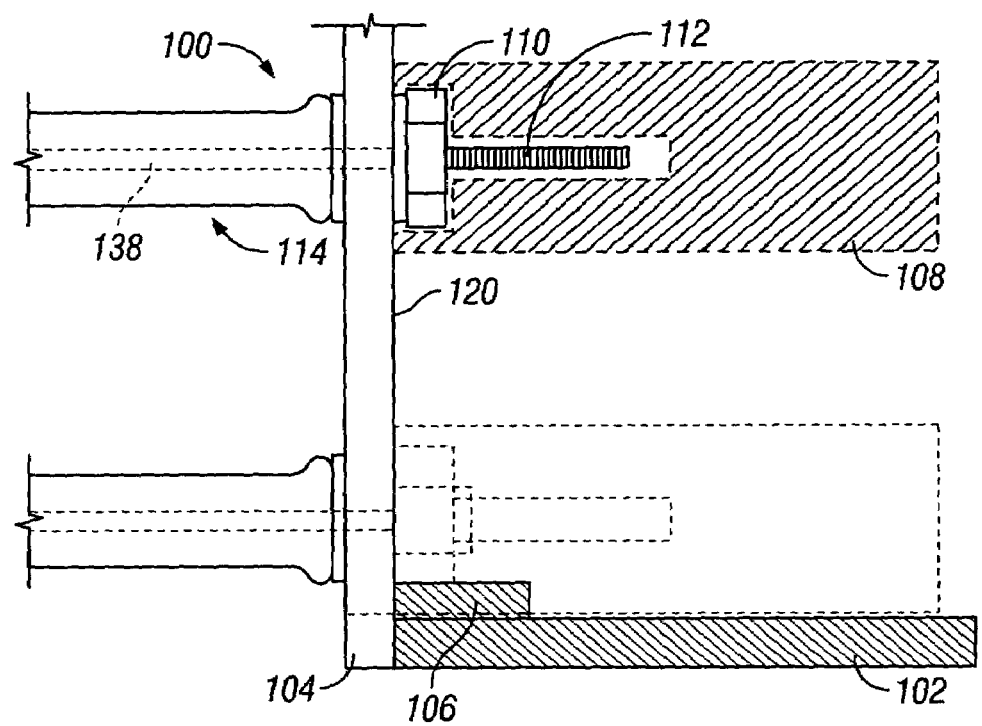
FIG. 4 is a fragmentary side elevational view showing both an optional removable handle for one form of the invention and also showing a removable plate for floor mounting another form of the invention.

FIG. 4 shows two other variations of the apparatus 100. In one case, the apparatus 100 may be held by a floor-mounted member 102 which is attached by being dovetailed into the frame 120 at a junction point 104. FIG. 4 shows a stiffener 106 being added. The member is usually held down by the foot of the operator. Of course, the member may be L-shaped so the frame 120 may be held off the ground or floor.

In another aspect, FIG. 4 shows a handle 108 which fits snugly over a nut 110 which engages a threaded extension 112 of the axle 138 holding the reforming roller 114. The handle 108 can be grasped by the operator to rotate the fixture 100 in the event the fixture 100 and not the seal is to be rotated.

FIG. 4 also shows that the handle may be alternatively placed (phantom lines) on another nut and axle assembly if this is desired for any reason.

Figure 6:
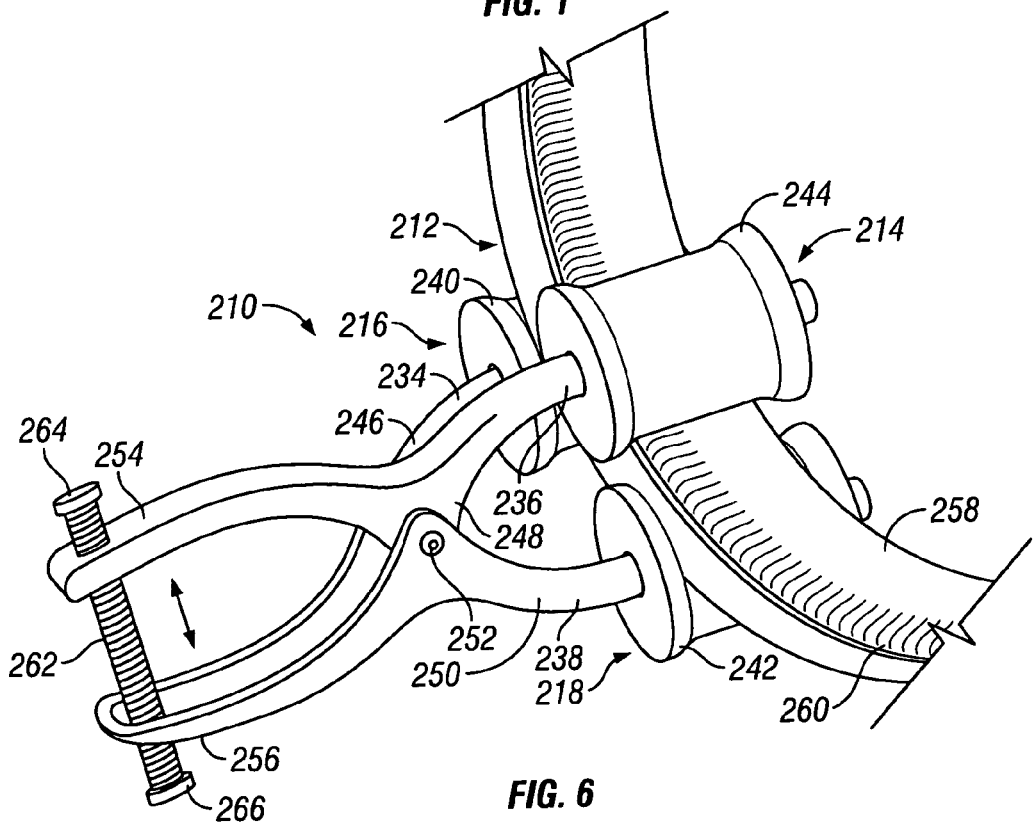
FIG. 6 is a perspective view of an embodiment of the invention in the form of a pliers-like apparatus.

Referring now to FIG. 6, there is shown an alternative form of apparatus 210 for reforming a seal 212. In this embodiment, there are three rollers 214, 216, 218 each having flanges 240, 242, 244 on them and journaled on axles 234, 236, 238 which form the end portions or arms 246, 248, 250 of the apparatus 210. The apparatus 210 resembles a pliers with three arms 246, 248, 250 pivoted about a locating pin 252 and operated by two hand-held levers 254, 256. The levers 254, 256 are moved apart to form the guide rollers 216, 218 and the reforming roller 214 together, thus reforming the free edge portion 258 of the resinous lip 260 to an enlarged i.d. This may be done one time or several times, depending on the thickness of the lip material, etc. A threaded rod 262 is provided to help urge the levers 254, 256 apart, and this is done by manipulating one or both knobs 264, 266. This technique, using an easily manipulated, lightweight apparatus 210, is most suitable for smaller diameter, lightweight seals.

There is another obvious variation of the apparatus shown in FIG. 1. In some large diameter seals, the arrangement is reversed, so that the inside diameter (i.d.) of the seal contains both the inner and outer casing flanges, with the lip projecting toward the outside. In other words, the edge 64 of the lip 60 would be the largest diameter, and there would be a need to reform it to a smaller outside diameter (o.d.). In such an instance, the flanges 50,56 would lie on the i.d. rather than the o.d. of the seal assembly.

In using the apparatus, the axles 34, 36 and the rollers 16, 18 would be placed inside the seal and the roller 14 on the axle 38 on the outside. The reforming roller would then move to a smaller diameter as the lip would be reformed.

The apparatus and method of the invention are the same as just described in the event the resinous lip is affixed to the seal assembly in a different way. For example, in some instances, the TFE forming the resinous lip is of such a composition that it may be bonded directly to the casing. In another and more common instance, the Teflon (TFE) lip is bonded or sealed to a rubber or rubber-based gasket or intermediate member which in turn is bonded to the metal casing. These are variations of the seal manufacture and do not affect the method or apparatus of the invention, which acts on the seals in the same way.

It will thus be seen that the present invention provides several apparatus and methods having a number of advantages and characteristics including those expressly pointed out herein, and others which are inherent in the invention. A few embodiments of the product of the invention, having been shown and described, it is anticipated that variations to the described form of apparatus will occur to those skilled in the art and that such modifications and changes may be made without departing from the spirit of the invention or the scope of the appended claims.

The invention claimed is:

1. An apparatus for reforming the free resinous lip portion of a seal having the resinous portion securely held with respect to at least an outer case, said apparatus including a frame unit having two leg portions and a generally central backbone portion, a slot in at least said backbone portion, an axle in said slot in said backbone, a pair of axles for said leg portions, a roller unit received over each axle, and adjustment means for at least said axle in said backbone, two of said roller units being guide rollers circumferentially spaced apart relative to said outer case, and the other roller unit being a reforming roller adapted to engage said free resinous lip portion of said seal and to press said resinous lip radially toward said two guide rollers, said reforming roller being adjustable so as to exert varying degrees of radial force on said free resinous lip portion.

2. An apparatus as defined in claim 1, wherein said resinous lip is crimped between and inner case and said outer case.

3. An apparatus as defined in claim 1, wherein said reforming roller presses said resinous lip radially outwardly.

4. An apparatus as defined in claim 1, wherein said reforming roller presses said resinous lip radially inwardly.

5. An apparatus as defined in claim 1, wherein said frame unit has an additional slot in each leg portion.

6. An apparatus as defined in claim 1, wherein said guide roller each includes at least one flange on the axial end portion thereof.

7. An apparatus as defined in claim 1, wherein said guide roller each includes two flanges on said roller, one flange on each axial end portion thereof.

8. An apparatus as defined in claim 1, wherein said axles each includes a fastener securing said axle to said form.

9. An apparatus as defined in claim 5, wherein each axle has associated therewith an anti-friction means between said roller and said frame.

10. An apparatus as defined in claim 6, wherein each axle has associated therewith an additional anti-friction means between said roller and said axle.

11. A method of temporarily reforming the profile of a resinous sealing lip in a seal assembly having at least one resinous sealing lip securely held with respect to an outer case, said method comprising positioning a seal including said cases between two guide rollers spaced circumferentially apart on the outer diameter of said seal, positioning a third, reforming roller between said two rollers and in a position of engagement with said resinous lip so as to cause said lip to be disturbed from its relaxed position and toward a larger inner diameter, and rotating said seal assembly relative to said third roller repeatedly while said third roller engages said resinous lip, thereby causing said resinous lip to be bell-mouthed and temporarily deformed to a larger inside diameter, and thereafter promptly installing said seal in an application.

12. A method as defined in claim 11, wherein said seal assembly includes an inner case.

13. A method as defined in claim 8, wherein said seal assembly is rotated and said rollers remain in a fixed position.

14. A method as defined in claim 8, wherein said rollers are rotated and said seal casing remains in a fixed position.

15. A method as defined in claim 8, which includes the step of repositioning said third roller to a second larger diameter after reforming said lip to a first, larger diameter.

16. A method of temporarily reforming the profile of a resinous sealing lip in a seal assembly having at least one resinous sealing lip securely held with respect to an outer case, said method comprising positioning a seal including said cases between two guide rollers spaced circumferentially apart, positioning a third, reforming roller between said two rollers and in a position of engagement with said resinous lip, forcing said third roller radially outwardly against said resinous lip so as to cause said lip to be disturbed from its relaxed position and toward a larger outer diameter, and rotating said seal assembly relative to said third roller repeatedly while said third roller engages said resinous lip, thereby causing said resinous lip to be bell-mouthed and temporarily deformed to a larger outer diameter, and thereafter promptly installing said seal in an application.

17. A method as defined in claim 16 in which said seal assembly includes an inner case.

18. An apparatus for reforming the free resinous lip portion of a seal, said apparatus including a bifurcated first part supporting first and second rollers on one end thereof and having an opposite end forming a grasping surface, a second part having a third roller at one end and a grasping surface on the other end, pivot means holding said first and second parts together, whereby said movement in a first direction of said grasping surfaces results in movement in the opposite direction of said rollers, means for positioning a seal between said rollers such that two of said rollers engage the casing portion of said seal and the third roller engages said resinous lip, whereby said lip may be urged to a different diameter.

19. An apparatus as defined in claim 18, wherein at least two of said rollers each includes a flange on the outside end thereof, to prevent said seal from coming fee from said apparatus.

20. An apparatus as defined in claim 18, wherein said apparatus includes means for positively urging said two grasping surfaces apart, said means being readily adjustable by hand.

21. An apparatus as defined in claim 18, wherein said means includes a threaded rod with at least one knob on the end portion thereof.

* * * * *